United States Patent
Kawabe et al.

(10) Patent No.: US 8,677,838 B2
(45) Date of Patent: Mar. 25, 2014

(54) CONTACT-PRESSURE DETECTING APPARATUS AND INPUT APPARATUS

(75) Inventors: Hideo Kawabe, Saitama (JP);
Masatoshi Ueno, Kanagawa (JP);
Shinobu Kuriya, Kanagawa (JP);
Kenichi Kabasawa, Saitama (JP);
Toshiyuki Nakagawa, Kanagawa (JP);
Tetsuro Goto, Tokyo (JP); Tsubasa Tsukahara, Tokyo (JP)

(73) Assignee: Sony Corporation, Tokyo (JP)

( * ) Notice: Subject to any disclaimer, the term of this patent is extended or adjusted under 35 U.S.C. 154(b) by 330 days.

(21) Appl. No.: 13/181,557

(22) Filed: Jul. 13, 2011

(65) Prior Publication Data

US 2012/0017702 A1  Jan. 26, 2012

(30) Foreign Application Priority Data

Jul. 20, 2010 (JP) .................. 2010-163003

(51) Int. Cl.
*G01L 1/00* (2006.01)
*G01L 5/00* (2006.01)

(52) U.S. Cl.
USPC .................................... 73/862.381

(58) Field of Classification Search
USPC .................................... 73/862.381
See application file for complete search history.

(56) References Cited

U.S. PATENT DOCUMENTS

| 3,197,927 | A | * | 8/1965 | Fuller | 52/81.4 |
|---|---|---|---|---|---|
| 5,262,777 | A | * | 11/1993 | Low et al. | 341/20 |
| 5,666,473 | A | * | 9/1997 | Wallace | 345/420 |
| 6,891,527 | B1 | * | 5/2005 | Chapman et al. | 345/158 |
| 6,981,787 | B2 | * | 1/2006 | Brown | 362/467 |
| 7,082,578 | B1 | * | 7/2006 | Fishkin et al. | 715/863 |
| 8,199,107 | B2 | * | 6/2012 | Xu et al. | 345/158 |
| 8,441,434 | B2 | * | 5/2013 | Vaananen et al. | 345/156 |
| 2012/0011932 | A1 | * | 1/2012 | Nakagawa et al. | 73/379.02 |
| 2012/0017702 | A1 | * | 1/2012 | Kawabe et al. | 73/862.381 |
| 2012/0139944 | A1 | * | 6/2012 | Kuriya et al. | 345/649 |
| 2012/0154387 | A1 | * | 6/2012 | Tsukahara et al. | 345/419 |
| 2012/0179408 | A1 | * | 7/2012 | Goto et al. | 702/104 |
| 2012/0256739 | A1 | * | 10/2012 | Kawabe et al. | 340/407.2 |
| 2013/0027294 | A1 | * | 1/2013 | Nakagawa et al. | 345/156 |
| 2013/0027295 | A1 | * | 1/2013 | Kuriya et al. | 345/156 |
| 2013/0027299 | A1 | * | 1/2013 | Tsukahara et al. | 345/157 |
| 2013/0088421 | A1 | * | 4/2013 | Ueno et al. | 345/156 |

FOREIGN PATENT DOCUMENTS

JP   4065618   1/2008

\* cited by examiner

*Primary Examiner* — Lisa Caputo
*Assistant Examiner* — Jamel Williams
(74) *Attorney, Agent, or Firm* — Dentons US LLP

(57) ABSTRACT

There is provided a contact-pressure detecting apparatus including a base, at least three pressure-sensitive sensors, and a plurality of plates. The base has an arbitrary shape. The at least three pressure-sensitive sensors are provided on different vertex positions of a polygon having at least three corners, respectively, the polygon being set on each of a plurality of areas partitioning at least part of an area on a surface of the base. The plurality of plates are arranged corresponding to the areas of the base, respectively, the plurality of plates covering the surface of the base by sandwiching the at least three pressure-sensitive sensors with the base.

13 Claims, 17 Drawing Sheets

CONTACT-PRESSURE DETECTING APPARATUS AND INPUT APPARATUS

BACKGROUND

The present disclosure relates to a contact-pressure detecting apparatus detecting a contact pressure of a contact object, and an input apparatus inputting control information to a control-target device by using the contact-pressure detecting apparatus.

In a manipulator, a sensing means such as a pressure-sensitive sensor, an ON/OFF switch, or a proximity sensor is provided on a surface of an arm or a hand or provided on a surface of a work. Based on outputs of the sensing means, the position and the shape of the work are recognized and reflected on operations.

Meanwhile, with the development of electronic equipment devices in these days, in man-machine interface devices typified by a mouse and a remote controller, not only means for turning on/off the limited number of switches arranged on the interface device, but also means for detecting positions, operations, and a grasp force of hands and fingers that operate the device as control signals are desired.

For example, Japanese Patent No. 4065618 (hereinafter, referred to as Patent Document 1) discloses an apparatus including a number of sensors arrayed on an object surface in a mesh (array) form. The apparatus detects pressures, displacements, and the like generated when the object surface deforms to thereby detect an external force applied on the object surface.

However, in such a detecting apparatus including a number of sensors arrayed in a mesh form, in order to improve detection accuracy, an extremely large number of mesh divisions are required, and the number of sensors to be arranged may correspond to the mesh division. The reasons are as follows.

1. The sensor capable of effectively receiving an applied pressure is limited to a sensor immediately below the point of application of a force or a sensor extremely close to the point. Therefore, variations generate in outputs of sensors according to positional relations of points of application of a force and sensors detecting the force. It is thus difficult to accurately detect applied pressures.

2. In a case of detecting the position of a point of application of a force, the detection resolution depends on the arrangement density of sensors. Therefore, a number of sensors are required as a result.

When the number of sensors increases, the cost increases as a matter of course, and the number of electrical wirings to the respective sensors also increases. Such a number of wirings are easily obtained by photolithography process. However, because of characteristics of photolithography process, modes of a sensor-arranged surface may be limited. For example, in photolithography process, a flat detecting surface is easily obtained. However, it is difficult to obtain a three-dimensionally curved detecting surface, specifically, a detecting surface having a target curved-surface shape.

SUMMARY

In view of the above-mentioned circumstances, it is desirable to provide a contact-pressure detecting apparatus and an input apparatus which may satisfactorily detect a pressure-applied position and an applied pressure of a contact object by using a small number of pressure-sensitive sensors.

According to an embodiment of the present disclosure, there is provided a contact-pressure detecting apparatus including a base having an arbitrary shape, at least three pressure-sensitive sensors provided on different vertex positions of a polygon having at least three corners, respectively, the polygon being set on each of a plurality of areas partitioning at least part of an area on a surface of the base, and a plurality of plates arranged corresponding to the areas of the base, respectively, the plurality of plates covering the surface of the base by sandwiching the at least three pressure-sensitive sensors with the base.

According to the embodiment of the present disclosure, three or more pressure-sensitive sensors provided on different vertex positions of a polygon having three or more corners on each area, respectively, may detect a contact of a contact object such as a finger of a user on a plate corresponding to the area. Therefore, a contact-pressure detecting apparatus including a relatively small number of sensors and including a surface of a base having an arbitrary shape as a detecting surface may be provided.

The contact-pressure detecting apparatus according to the embodiment of the present disclosure may further include a calculating section configured to calculate, based on detection results of the at least three pressure-sensitive sensors provided on each of the areas, a pressure applied to the plate corresponding to the area and a pressure-applied position. As a result, based on a detection result by three or more pressure-sensitive sensors provided on different vertex positions of a polygon having three or more corners on each area, respectively, a position and a pressure that a contact object such as a finger of a user contacts a plate corresponding to the area may be calculated. Therefore, a contact-pressure detecting apparatus including a relatively small number of sensors and including a surface of a base having an arbitrary shape as a detecting surface of a contact position and an applied pressure may be provided.

According to the embodiment of the present disclosure, each of the vertex positions of the polygon on the area coincides with any one vertex position of the polygon on at least one other area, and the pressure-sensitive sensor is provided on each location on which the vertex positions of the plurality of areas coincide with each other, the pressure-sensitive sensor being capable of detecting pressures applied to the plurality of plates corresponding to the plurality of areas, respectively. As a result, one pressure-sensitive sensor may detect part of pressures applied to the plates corresponding to the plurality of areas, respectively. Therefore, increase of the number of the pressure-sensitive sensors, which may be increased in the case of partitioning the surface of the base into further smaller areas to improve the detection accuracy, may be suppressed.

According to the embodiment of the present disclosure, the base may have an arbitrary solid shape, and the base may be covered by the plurality of plates three-dimensionally. Therefore, a contact-pressure detecting apparatus including a relatively small number of sensors and including a surface of a base having an arbitrary shape as a detecting surface of a contact position and an applied pressure may be provided.

The contact-pressure detecting apparatus according to the embodiment of the present disclosure may further include a movement detecting section configured to detect a movement in a three-dimensional space.

According to an embodiment of the present disclosure, there is provided an input apparatus including a base having an arbitrary shape, at least three pressure-sensitive sensors provided on different vertex positions of a polygon having at least three corners, respectively, the polygon being set on each of a plurality of areas partitioning at least part of an area on a surface of the base, a plurality of plates arranged corresponding to the areas of the surface of the base, respectively, the plurality of plates covering the surface of the base by sandwiching the at least three pressure-sensitive sensors with the base, and a controller section configured to generate information for controlling a device being a control target based on results detected by the respective pressure-sensitive sensors.

According to the input apparatus of the embodiment of the present disclosure, three or more pressure-sensitive sensors provided on different vertex positions of a polygon having three or more corners on each area, respectively, may detect a contact of a contact object such as a finger of a user on a plate corresponding to the area. Further, based on the result, a control-target device may be controlled.

In the input apparatus according to the embodiment of the present disclosure, the controller section may be configured to calculate, based on detection results of the at least three pressure-sensitive sensors provided on each of the areas, a pressure applied to the plate corresponding to the area and a pressure-applied position, and to generate information for controlling a device based on the calculated result. As a result, information intended by a user may be input with a position that a finger of a user touches and an applied pressure. Other than the above, a user may input control information to a control-target device with intuitive operations.

The input apparatus according to the embodiment of the present disclosure may further include a movement detecting section configured to detect a movement in a three-dimensional space. The controller section may be configured to generate information for controlling the device based on results detected by the respective pressure-sensitive sensors and a result detected by the movement detecting section. As a result, the controller section may execute various controls to a control target displayed in a virtual three-dimensional space based on combinations of movement information on movement displacement, movement velocity, movement acceleration, rotational displacement, rotational velocity, rotational acceleration, and the like in a three-dimensional space and information on pressure-applied position, applied pressure, and the like detected by the pressure-sensitive sensors.

The input apparatus according to the embodiment of the present disclosure may further include a radio communication section configured to transmit the information for controlling the device generated by the controller section by radio. As a result, an input apparatus enabling remote-control may be provided.

The input apparatus according to the embodiment of the present disclosure may further include means for returning a response to a pressing operation by a user in real time.

In the input apparatus according to the embodiment of the present disclosure, the controller section is configured to generate time-series information on at least calculated pressure-applied positions as handwriting information.

As described above, according to the embodiments of the present disclosure, by using a small number of pressure-sensitive sensors, a pressure-applied position and an applied pressure of a contact object may be detected satisfactorily.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

The embodiments relate to a contact-pressure detecting apparatus detecting contact of a contact object such as a finger of a user based on detection of pressures at the time of contact by using a pressure-sensitive sensor. The present embodiments further relate to an input apparatus being a man-machine interface device using the contact-pressure detecting apparatus. The contact-pressure detecting apparatus is an apparatus having a solid outer shape. A purpose of the contact-pressure detecting apparatus is to detect a position on the solid surface that a contact object contacts (pressure-applied position) and a pressure (applied pressure). The input apparatus using the contact-pressure detecting apparatus is an apparatus generating information for controlling an external electronic device and outputting the information to the electronic device. That is, the input apparatus is an apparatus generating information for controlling an electronic device based on a pressure-applied position on the solid surface and an applied pressure detected by the contact-pressure detecting apparatus, and supplying the information to the electronic device.

First Embodiment

Figure 1:
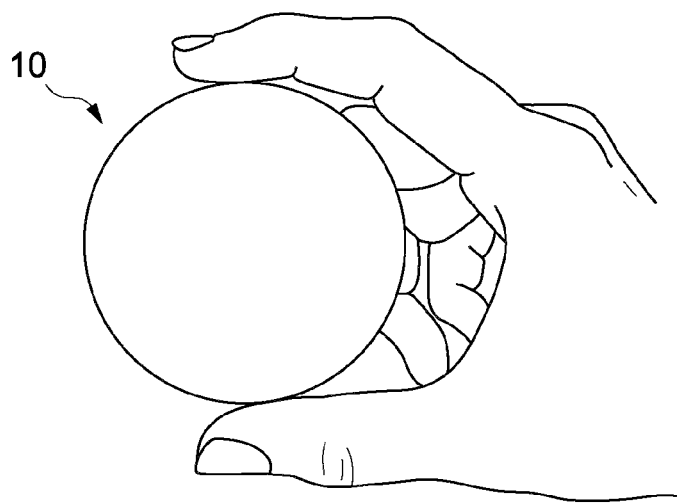
FIG. 1 is a diagram showing an outer appearance and a use mode of an input apparatus using a contact-pressure detecting apparatus according to a first embodiment of the present disclosure.
Figure 2:
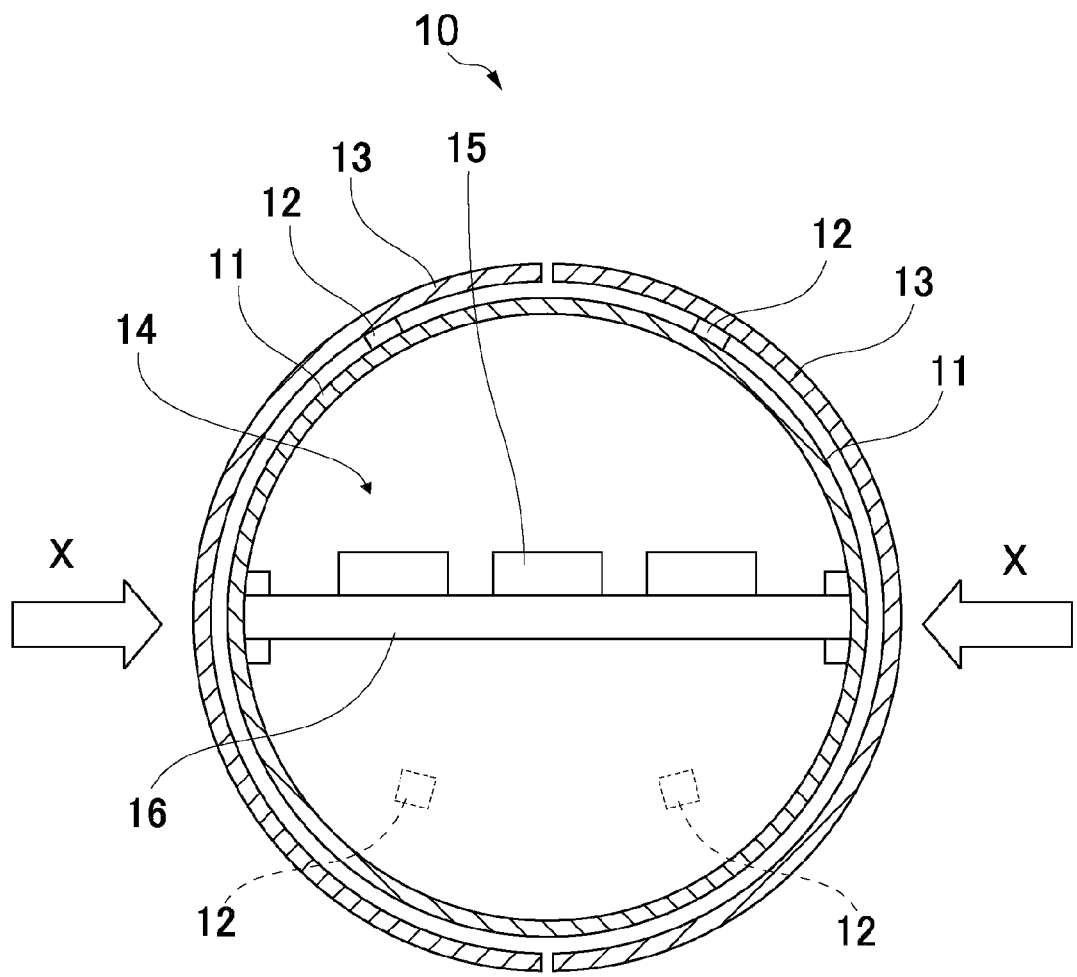
FIG. 2 is a sectional view showing a structure of the input apparatus of FIG. 1.
Figure 3:
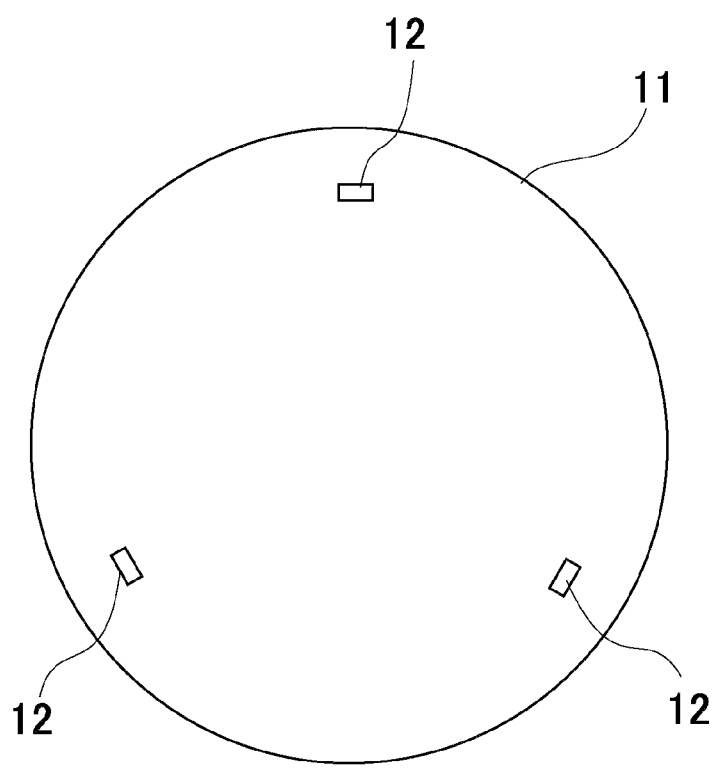
FIG. 3 is a diagram showing a base surface of the input apparatus of FIG. 2 in each X-arrow direction.

FIG. 1 is a diagram showing an outer appearance and a use mode of an input apparatus 10 using a contact-pressure detecting apparatus according to a first embodiment of the present disclosure. FIG. 2 is a sectional view showing a structure of the input apparatus 10 of FIG. 1. FIG. 3 is a diagram showing a base surface of the input apparatus 10 of FIG. 2 in each X-arrow direction.

As shown in those diagrams, the input apparatus 10 includes a base 11, three or more pressure-sensitive sensors 12, and a plurality of plates 13. The base 11 has an arbitrary solid shape. The three or more pressure-sensitive sensors 12 are provided on the surface of the base 11 in a dispersed manner. The plurality of plates 13 are provided so as to cover the entire surface of the base 11 by sandwiching the respective pressure-sensitive sensors 12 with the base 11.

Here, the arbitrary solid shape of the base 11 is a sphere, a polyhedron, a cylindrical column (cylinder), a cone, an oval sphere, a semiregular polyhedron, or the like. In this embodiment, the base 11 having a sphere shape is employed. The entire surface or part of the surface of the base 11 is partitioned into a plurality of areas. The number of the partitioned area may be two or more. In this embodiment, the entire surface of the sphere is partitioned. Although the sizes of the respective partitioned areas may or may not be the same, the sizes are the same in this embodiment. On each of the areas, the three or more pressure-sensitive sensors 12 are arranged. Those pressure-sensitive sensors 12 are arranged on respective vertex positions of a polygon having three or more corners. FIG. 3 shows one area on the base 11. As shown in FIG. 3, in this embodiment, the three pressure-sensitive sensors 12 are arranged for each area. Further, the plurality of plates 13 are arranged in a one-to-one correspondence with the respective areas of the base 11. The plurality of plates 13 are arranged so as to entirely cover the surface of the base 11 by sandwiching the respective pressure-sensitive sensors 12 with the base 11. In the case where the base 11 is a sphere, the plates 13 provided corresponding to the two respective areas have parabolic shapes, respectively. Specifically in a case where the mounting surface of the base 11 is a spherical surface or a cylindrical-columnar surface, the pressure-sensitive sensor 12 may be film-type or thin-plate-type so as to be easily attached on the surface.

The material, thickness, and the like of the plate 13 are arbitrarily selected such that the plate 13 has stiffness with which, when the plate 13 is deformed because of an applied pressure of a man-induced range, the back surface of the plate 13 does not abut on the surface of the base 11 and force transmission to the pressure-sensitive sensors 12 does not decrease, or more.

The base 11 has an internal hollow portion 14. A board 16 is provided in the hollow portion 14. Electronic components including a controller 15 (calculating section, controller section) are mounted on the board 16. The controller 15 captures outputs from the respective pressure-sensitive sensors 12, and executes predetermined arithmetic processing based on those outputs. More specifically, the controller 15 may execute arithmetic processing to obtain, based on detection results of the three or more pressure-sensitive sensors 12 provided on each area, a position that a contact object such as a finger of a user strikes on the plate 13 corresponding to the area (pressure-applied positions) and an applied pressure. A method of detecting a pressure-applied position and an applied pressure will be described later. Further, based on the detected pressure-applied position and applied pressure, the controller 15 controls to generate information for controlling an electronic device being a control target, and to supply the information to the electronic device.

Note that the controller 15 may be structured to execute arithmetic processing to obtain a position that a contact object such as a finger of a user strikes on the plate 13 corresponding to the area (pressure-applied position) and an applied pressure based on detection results of the three or more pressure-sensitive sensors 12 provided on each area, and to output the results to the outside. In the case of employing such a structure, the apparatus functions as a contact-pressure detecting apparatus.

Next, a method of detecting, based on outputs of the three or more pressure-sensitive sensors 12 provided on each area, a pressure-applied position on the plate 13 corresponding to the area and an applied pressure in this embodiment will be described.

To make the description simple, the plate 13 is assumed to be a flat plate, not a parabolic-shaped plate.

Figure 4A:
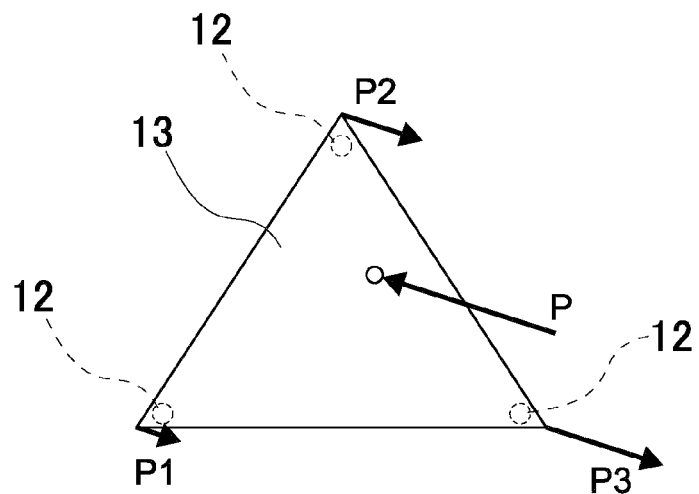
FIG. 4A is a plan view for explaining a principle of detecting a pressure-applied position and an applied pressure by the input apparatus of the first embodiment.
Figure 4B:
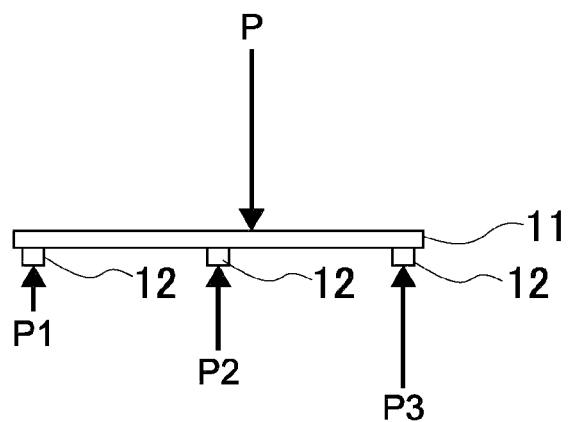
FIG. 4B is a side view of FIG. 4A.

FIGS. 4A and 4B are a plan view and a side view for explaining the detection principle.

Figure 5:
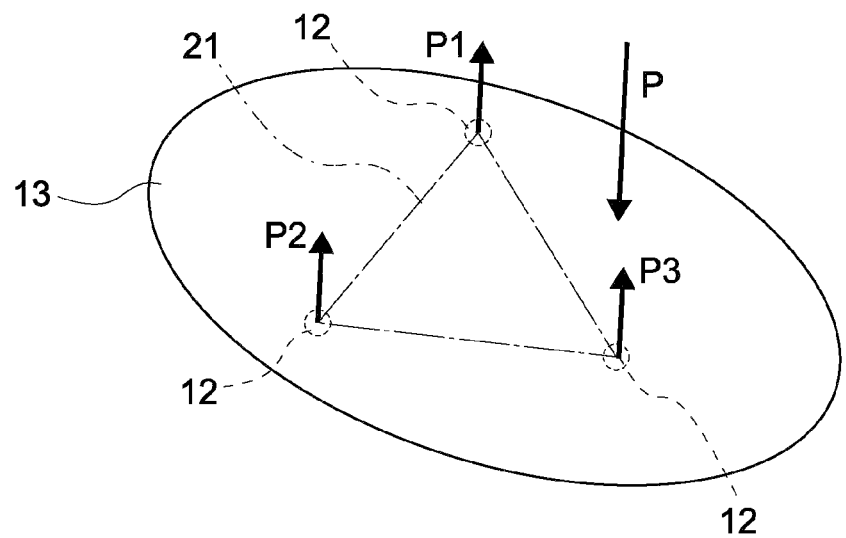
FIG. 5 is a diagram for explaining a detection principle in a case of using a pressure-sensitive sensor designed for positive and negative pressures.

It is assumed that the three pressure-sensitive sensors 12 are mounted corresponding to positions of respective corner portions of the triangular flat-plate-type plate 13. The three pressure-sensitive sensors 12 are capable of detecting pressures applied to the plates 13 as three partial pressures, respectively. Here, it is assumed that a force P is applied to an arbitrary position on the plate 13 as a pressure-applied position. The applied pressure P is dispersed on the plate 13, and is given to the three pressure-sensitive sensors 12 arranged corresponding to the three corner portions of the plate 13 in a split manner. That is, in a case where forces applied to the respective three pressure-sensitive sensors 12 are referred to as P1, P2, P3, respectively, the equation P=P1+P2+P3 is established. That is, on whichever position on the plate 13 the force P is applied, the force P may be detected as the sum of the output values P1, P2, P3 of the three pressure-sensitive sensors 12. Further, in a case of using the pressure-sensitive sensors 12 designed for positive and negative pressures, for example, as shown in FIG. 5, even if a pressure-applied position is located at a position outside a triangular area 21 having vertexes of the three sensor positions, the force P applied to the plate 13 may be calculated in the same manner. Note that, in FIG. 5, P2 of outputs of the pressure-sensitive sensors 12 is a negative output.

Next, the method of calculating a pressure-applied position will be described with reference to FIG. 6.

Figure 6:
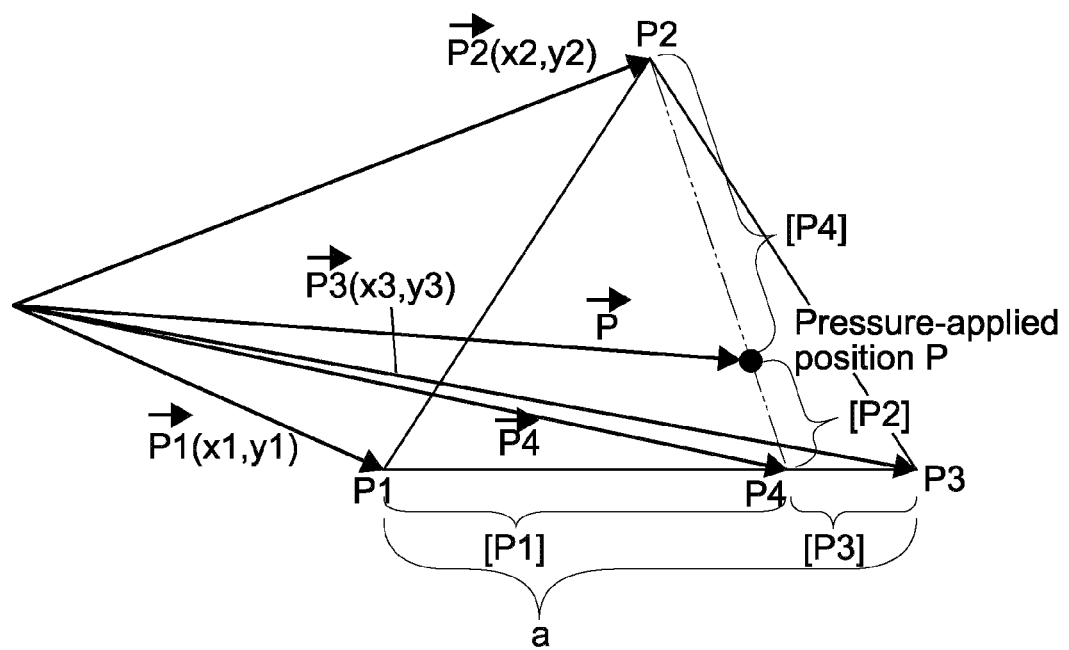
FIG. 6 is a diagram for explaining a method of calculating a pressure-applied position.

Since the positions of the pressure-sensitive sensors 12 are already known, the position vectors P1, P2, P3 may be drawn as shown in FIG. 6. Here, the position vector P4 at a point dividing a side "a" of the triangle at a ratio of output values [P3]:[P1] of the pressure-sensitive sensors 12 is represented by the following expression.

$$P4=(P1\times[P3]+P3\times[P1])/[P1]+[P3] \tag{1}$$

$$[P4]=[P1]+[P3]$$

Here, the pressure-applied position P is on a line connecting the point P4 and the point P2, and is a point dividing the line at the ratio of [P4]:[P2] in which [P4] is obtained by the above expression and [P2] is a sensor output. Therefore, similar to the above expression, the position vector P at the pressure-applied position is represented by the following expression.

$$P=(P2\times[P4]+P4\times[P2])/[P2]+[P4] \tag{2}$$

$$[P]=[P2]+[P4]=[P1]+[P2]+[P3]$$

That is, a force applied to a pressure-applied position and the position may be precisely calculated based on output values of the three pressure-sensitive sensors 12.

Here, the number of the pressure-sensitive sensors 12, three, is the number minimum required to calculate the force-applied position on one plane and the force by vector calculations. In a case where the number of the pressure-sensitive sensors 12 is increased to four or more, also, the similar calculating method may be used.

Figure 7:
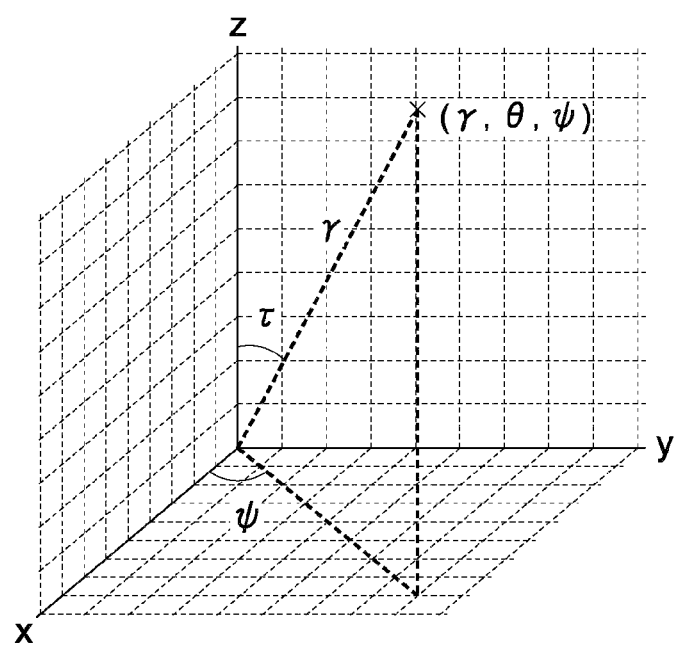
FIG. 7 is a diagram for explaining a method of calculating a pressure-applied position in a case where the base has a solid shape such as a sphere.

The above-mentioned principle is applicable to a surface of an object having a solid shape such as a sphere. In the case of the plate 13 having a spherical shape according to this embodiment, polar coordinates as shown in FIG. 7 may be used for vector calculation.

The above-mentioned vector expression (2) is represented in polar coordinates.

$$P=((([P3]\times\Psi1+[P1]\times\Psi3)/([P1]+[P3]),([P3]\times\tau1+ [P1]\times\tau3)/([P1]+[P3]),r) \quad (3)$$

$$[P]=[P2]+[P4]=[P1]+[P2]+[P3]$$

$$P=((([P4]\times\Psi2+[P2]\times\Psi4)/([P2]+[P4]),([P4]\times\tau2+ [P2]\times\tau4)/([P2]+[P4]),r) \quad (4)$$

$$[P]=[P2]+[P4]=[P1]+[P2]+[P3]$$

r=radius of sphere

By using this method, even in a case of a surface of an object having an arbitrary surface shape such as a spherical surface or a cylindrical-columnar surface, by partitioning the surface into several areas, and by making approximations as coordinate expressions of plane coordinates, polar coordinates, cylindrical coordinates, or the like corresponding to surface shapes of the respective areas, a pressure-applied position on the entire object surface having an arbitrary shape and an applied pressure may be calculated.

Note that, on the surface having an arbitrary shape, the number of partition areas to be provided may be at least the number of coordinate systems required to approximate the shape of the entire surface area.

Figure 8:
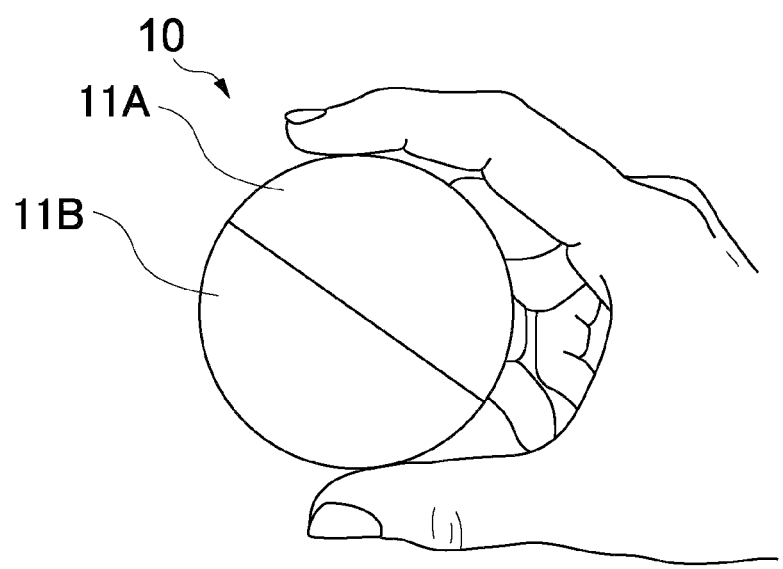
FIG. 8 is a diagram showing an operational method of the input apparatus of the first embodiment.

According to the input apparatus 10 of this embodiment, for example, as shown in FIG. 8, when the base 11 is grasped such that pressures of fingers of a user are individually applied to two areas 11A, 11B, respectively, the controller 15 may individually detect pressure-applied positions and applied pressures corresponding to the respective plurality of fingers of the user for the respective areas, and generate control information supplied to an electronic device based on the detection result. The controller 15 stores a table managing correspondences of combinations of pressure-applied positions and applied pressures for the respective areas and control information supplied to an electronic device, functions for generating control information supplied to an electronic device in which the pressure-applied position and the applied pressure are variables, and the like. It is considered that contents of the specific controls may be out of number.

Second Embodiment

In a second embodiment, two areas partitioning the surface of the spherical base 11 are further partitioned into three or more areas, respectively, and pressure-applied positions and applied pressures are detected for the respective areas, to thereby try to improve detection accuracy. In addition, the pressure-sensitive sensors 12 are arranged to be shared by the plurality of areas, to thereby suppress increase of the number of the pressure-sensitive sensors 12.

Figure 9A:
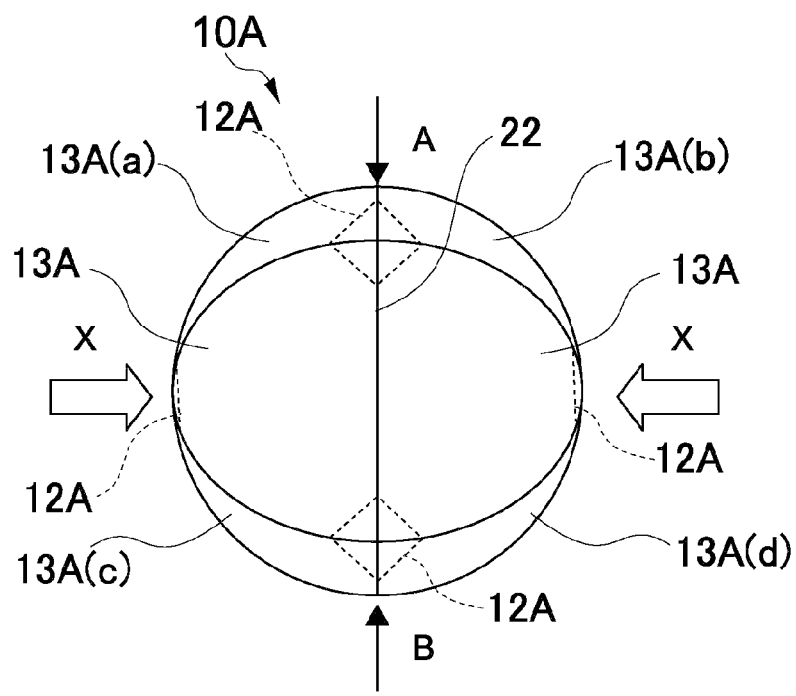
FIG. 9A is a side view showing an input apparatus of the second embodiment.
Figure 9B:
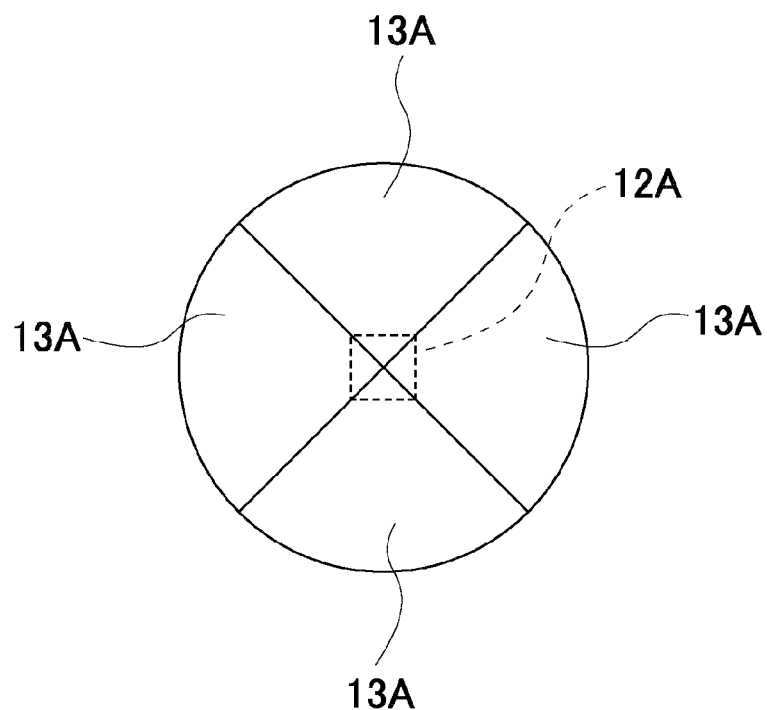
FIG. 9B is a side view showing the input apparatus of FIG. 9A in each X-arrow direction.

FIG. 9A is a side view showing an input apparatus 10A of the second embodiment. FIG. 9B is a side view showing the input apparatus 10A of FIG. 9A in each X-arrow direction.

In the input apparatus 10A, two respective areas partitioning the surface of the spherical base into two equal parts are further partitioned into four areas in directions orthogonal to the direction partitioning the two areas. As a result, the surface of the base is partitioned to eight areas. Each of the areas has a shape similar to a triangle having three corners. In the case of partitioning the areas as described above, a total of twenty-four corners of the eight areas are concentrated on six separate locations in which each of four corners are concentrated on one location. Further, eight plates 13A are arranged corresponding to the respective areas so as to entirely cover the surface of the base.

In the input apparatus 10A, film-type pressure-sensitive sensors 12A are arranged on the above-mentioned six locations on which the four corners are concentrated, respectively. As the film-type pressure-sensitive sensor 12A, one capable of receiving a pressure by a surface to detect the pressure such as, for example, a piezoelectric device may be used. In order to be capable of detecting, by one pressure-sensitive sensor 12A, part of a pressure applied to each of the four plates 13A corresponding to four areas having corners concentrated on one point, respectively, the pressure-sensitive sensor 12A is arranged such that the center of its pressure-sensitive area coincides with the point on which corners of four areas are concentrated. Note that, in this structure, one corner of the area corresponds to one vertex position of the above-mentioned polygon having three or more corners.

According to this embodiment, the surface of the base is divided into further smaller areas, and a pressure-applied position and an applied pressure are detected for each area, whereby detection accuracy may be improved.

Figure 10:
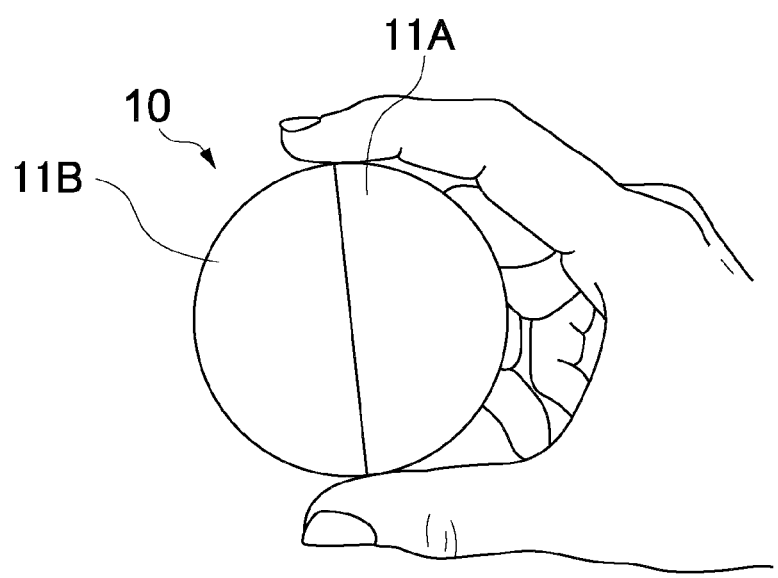
FIG. 10 is a diagram showing a mode of grasping the input apparatus of the first embodiment.

Further, as shown in FIG. 10, it is assumed a case where a user grasps the input apparatus 10 of the first embodiment in which the surface of the base 11 is partitioned into two equal parts such that fingers contact borderline of the plates 13 (borderline of areas).

In this case, there is a fear that most of the grasp force is canceled by deforming the plates 13, and the grasp force is not transmitted to the pressure-sensitive sensors 12. To the contrary, according to the input apparatus 10A of the second embodiment, since the arrangement of the pressure-sensitive sensors 12A on the solid surface are further denser, the possibility that a grasp force is canceled by deformation of the plates 13A is greatly decreased, and an effect to sensitivity depending on different ways of grasping may be greatly reduced.

For example, in FIG. 9A, in a case where the input apparatus is grasped from the both sides such that fingers contact a point A and a point B on a borderline 22 partitioning the base into two equal parts, a force applied to the point A is dispersed and transmitted to two plates 13A(a), 13A(b) sandwiching the borderline 22 (upper side in the drawing), and a force applied to the point B is dispersed and transmitted to two plates 13A(c), 13A(d) sandwiching the borderline 22 (lower side in the drawing). In this case, the pressure-applied position A may be detected by vector calculations of a rectangular area in which the two plates 13A(a), 13A(b) (upper side in the drawing) are combined, and the pressure-applied position B may be detected by vector calculations of a rectangular area in which the two plates 13A(c), 13A(d) (lower side in the drawing) are combined.

Further, the input apparatus 10A of the second embodiment is structured as follows. That is, the pressure-sensitive sensor 12A is arranged such that the center of its pressure-sensitive area coincides with the point on which corners of four areas are concentrated, and one pressure-sensitive sensor 12A may detect part of a pressure applied to each of the plates 13A corresponding to four areas, respectively. Therefore, increase of the number of the pressure-sensitive sensors 12A, which may be increased in the case of partitioning the surface of the base into further smaller areas to improve the detection accuracy, may be suppressed.

Meanwhile, although the surface of the base is partitioned into eight equal areas in the second embodiment, shapes and sizes of areas may not necessarily be equal. Further, the surface may be partitioned into eight or more areas. For example, in a case where the division number is twelve, pressure-applied positions and applied pressures may be detected on the respective plates completely independently.

Next, modified examples of the above-mentioned embodiments will be described.

Modified Example 1

Figure 11:
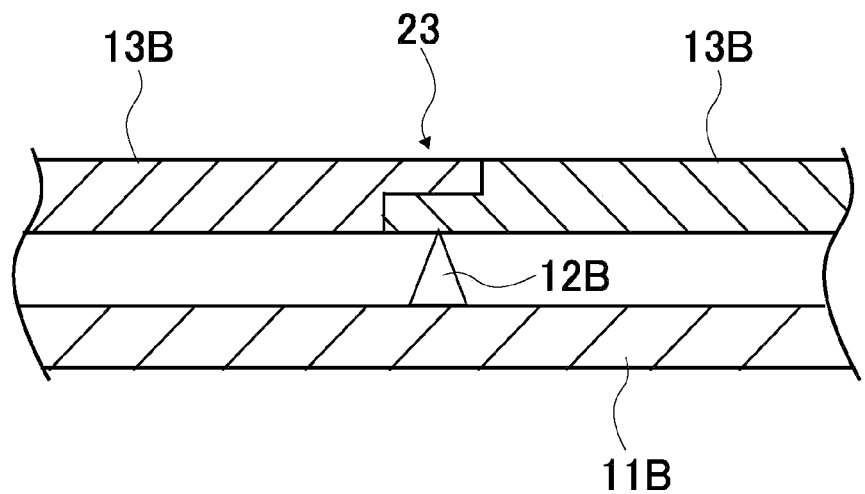
FIG. 11 is a diagram showing a modified example 1 of the present disclosure.

As shown in FIG. 2, in the first embodiment, the film-type pressure-sensitive sensors 12 are arranged between the base 11 and the plates 13. By using the film-type pressure-sensitive sensor 12, a pressure-sensitive area may be secured as a relatively large surface, and one pressure-sensitive sensor 12A may detect part of a pressure applied to each of the four plates 13A corresponding to four areas having corners concentrated on one point, respectively. However, the present disclosure is not limited to this. FIG. 11 is a structural example which may employ, as a pressure-sensitive sensor, not a film-type sensor but a pressure-sensitive sensor 12B capable of sensing a pressure at a point. That is, corner portions of the adjacent plates 13B are laminated on each other in the thickness direction of the plates 13B, and the pressure-sensitive sensor 12B is arranged immediately below a laminated portion 23 thereof. According to such a structure, a pressure-sensitive sensor other than a film-type sensor may be used.

Modified Example 2

Figure 12:
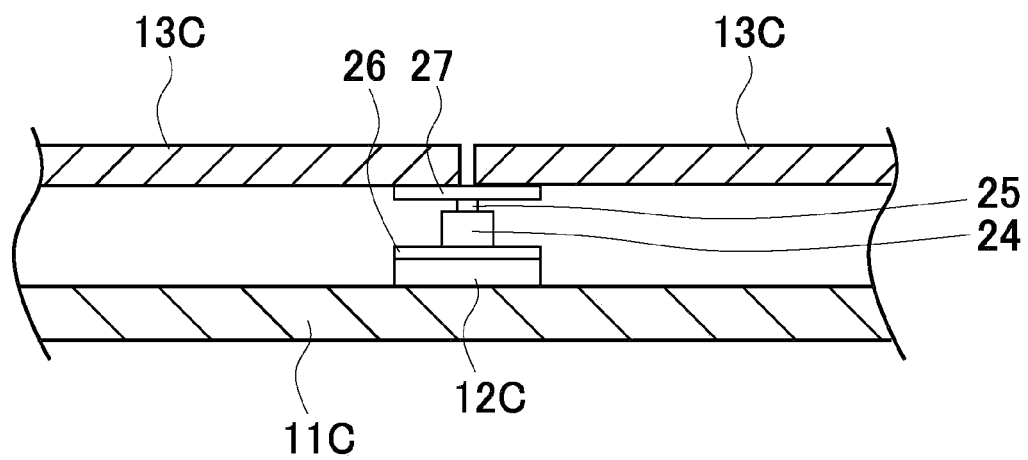
FIG. 12 is a diagram showing a modified example 2 of the present disclosure.

A modified example 2 is an example of a case where the apparatus is structured to return a response to a pressing operation by a finger of a user in real time. FIG. 12 shows an apparatus employing a snapshot switch 24 to return a so-called click feeling as a response. The snapshot switch 24 is an electronic component structured to generate a click feeling at the time of operating a button of a mouse and the like, and is also referred to as micro switch. The snapshot switch 24 includes an electrical switching mechanism and a click-feeling generating mechanism using an elastic body such as a plate spring. The snapshot switch 24 includes a movable portion 25 operating in a direction in which a pressure is applied to a plate 13C, and is structured to generate a click feeling because of the movement of the movable portion 25. The snapshot switch 24 is arranged on a film-type pressure-sensitive sensor 12C via a first pressure-dispersing plate 26. The first pressure-dispersing plate 26 is used to transmit a pressure received by the snapshot switch 24 to a surface of the pressure-sensitive sensor 12C necessary in view of its characteristics. Meanwhile, also on an end of the movable portion 25 of the snapshot switch 24, a pressure-dispersing plate as a second pressure-dispersing plate 27 is fixed. Further, on the second pressure-dispersing plate 27, corner portions of the respective plurality of plates 13C are mounted.

According to the modified example 2, click feelings are obtained at the respective timings of starting grasping the input apparatus and releasing, and a user may operate the input apparatus while sensuously confirming responses to operations. As a result, operability is improved. Further, an ON/OFF signal of the snapshot switch 24 may also be used as a trigger signal notifying a control-target electronic device that controls by a man are started.

Modified Example 3

It is assumed a case where the input apparatus according to each of the embodiments and the modified examples of the present disclosure may control an electronic device based on strength of a force that a user grasps the input apparatus with his hand. In this case, if a man may recognize a sense of grasping the input apparatus while changing a grasp force as not only a force but also a displacement, operational feelings of users may further be improved.

Figure 13:
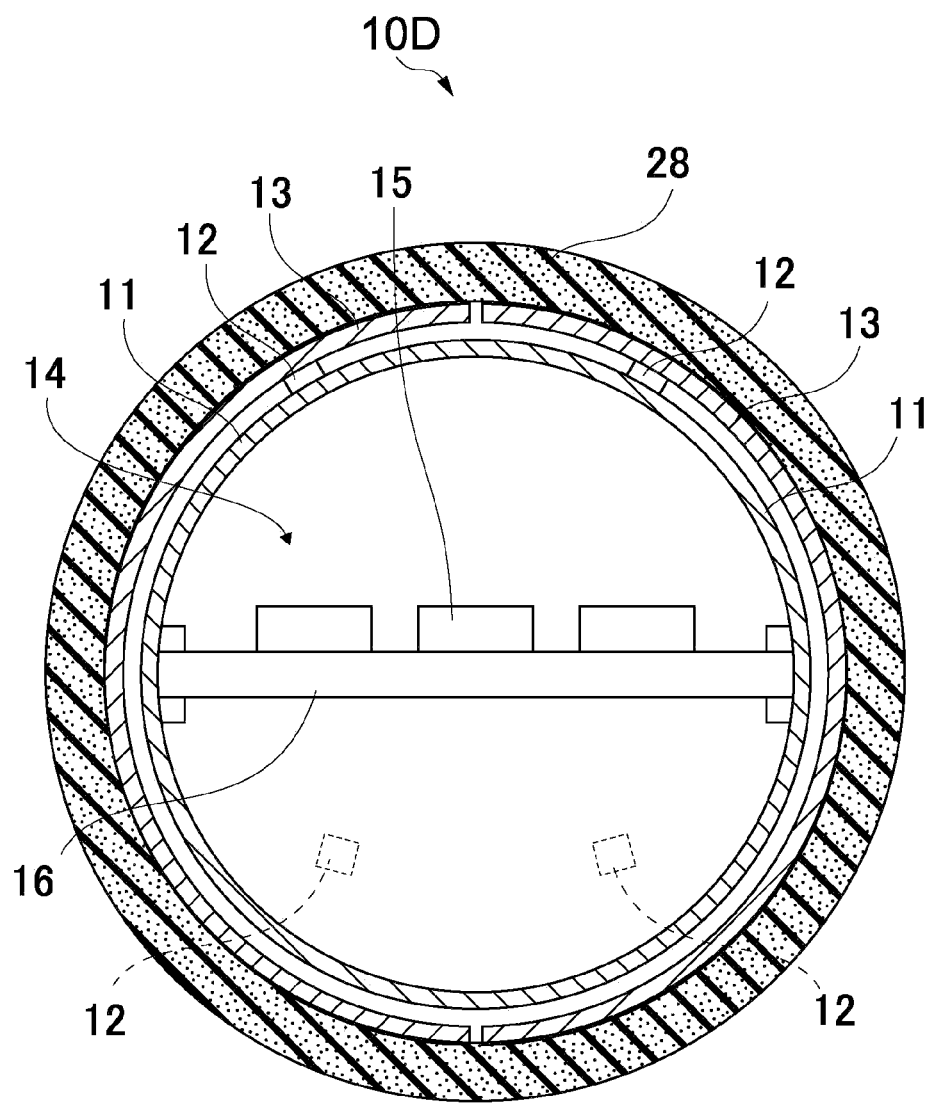
FIG. 13 is a diagram showing a modified example 3 of the present disclosure.

FIG. 13 is a diagram showing an example based on such a technological thought. An input apparatus 10D of a modified example 3 is entirely covered by an elastic material 28 such as a synthetic sponge. According to this structure, when the input apparatus is grasped, deformation according to the grasp force is transmitted to finger tips as displacement, whereby operational inputs of higher definition may be attained.

Further, the input apparatus may be structured to return a response to a user with a sound or a vibration in place of the click feeling and the displacement of the surface material or in place of one of them. In the case of returning a response with a sound or a vibration, the frequency or amplitude of the sound or vibration may be changed in response to a grasping force.

Modified Example 4

Figure 14:
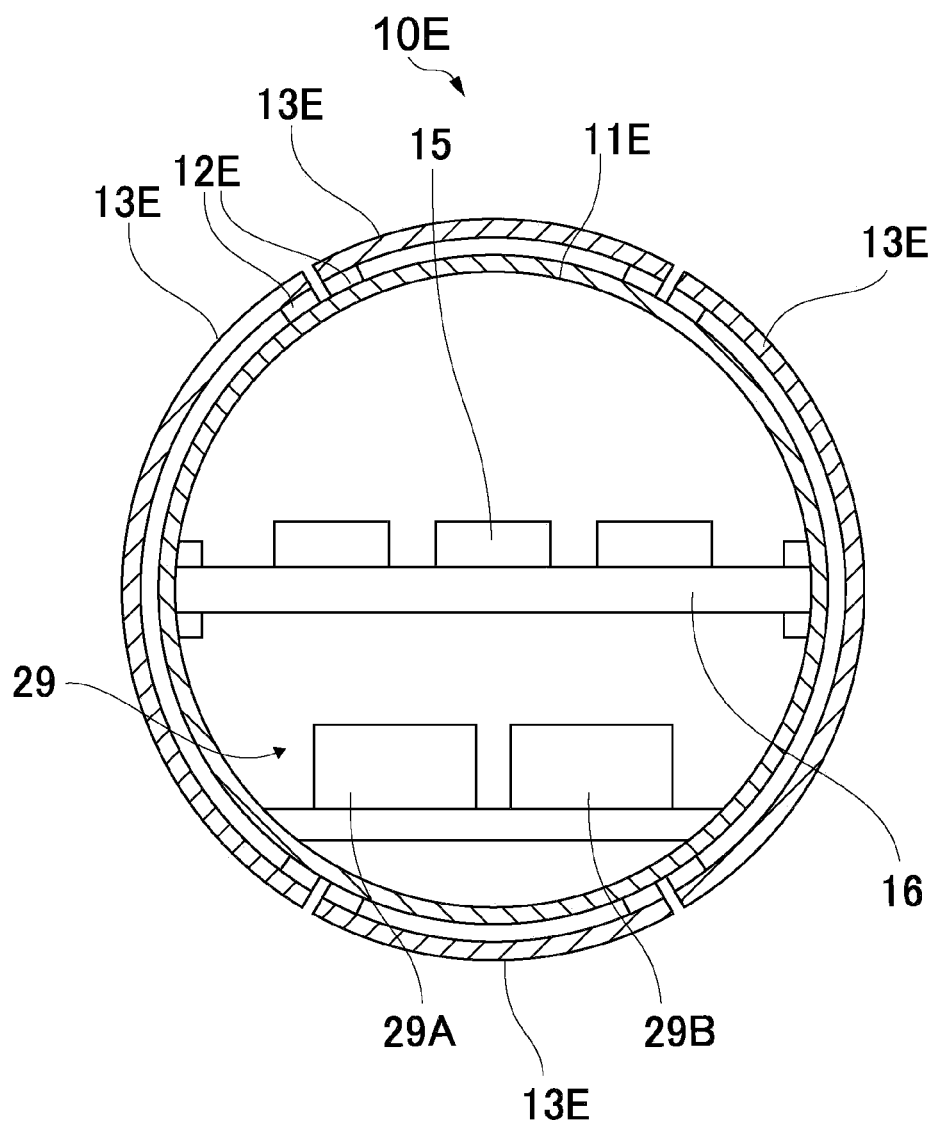
FIG. 14 is a diagram showing a modified example 4 of the present disclosure.

FIG. 14 is a diagram showing a structure of a modified example 4. According to the modified example 4, in order to prevent rolling when a spherical input apparatus 10E is mounted on a flat surface, electronic components 29 as weights for making eccentricity of the center of gravity larger are arranged in a hollow portion 14E in a base 11E. The input apparatus 10E includes, as the electronic components 29 being weights, a battery unit 29A such as a rechargeable battery and a radio communication device 29B so as to be used as a remote-control apparatus. Here, specifically, the load of the battery unit 29A such as a rechargeable battery is larger than the load of other electronic components in the hollow portion 14E such as the controller 15. Therefore, the battery unit 29A may be effectively used as a weight for making eccentricity of the center of gravity of the base 11E larger. In order to use both the battery unit 29A and the radio communication device 29B as weights, they are arranged at positions as far from the center of the hollow portion 14E in the base 11E as possible. Note that, if the board 16 on which electronic components such as the controller 15 are mounted is arranged at a position as close to the battery unit 29A and the radio communication device 29B as possible, also, the center of gravity may be set to a position farther from the center of the base 11E, and stability is further improved.

Meanwhile, in the base of the input apparatus of each of the above-mentioned embodiments and modified examples, sensors for detecting movement in a three-dimensional space such as, for example, an acceleration sensor and a gyro sensor may be mounted. In this case, the controller may execute various controls to a control target based on combinations of movement information on movement displacement, movement velocity, movement acceleration, rotational displacement, rotational velocity, rotational acceleration, and the like in a three-dimensional space detected by the sensors and information on pressure-applied position, applied pressure, and the like detected by the pressure-sensitive sensors. For example, the controller may execute an operation such as drag and drop on a PC with a mouse while adding control to switch multistep grasp forces. More specifically, various operations such as gently grasping a control-target object, moving it, and releasing it, and tightly grasping a control-target object, moving it, and releasing it may be employed. Note that the control target in this case may not be limited to a virtual object displayed in a virtual three-dimensional space, but may be a real object such as a robot executing master/slave operations.

Further, as described in the modified example 4, by mounting the radio communication device 29B, a control target may be remote-controlled wirelessly.

As the battery unit 29A of the modified example 4, a replaceable battery (primary cell) may be used. Alternatively, a structure including an electrical generation section converting operational movements to an electric power and a rechargeable battery with the electric power of the electrical generation section may be employed.

Modified Example 5

Figure 15:
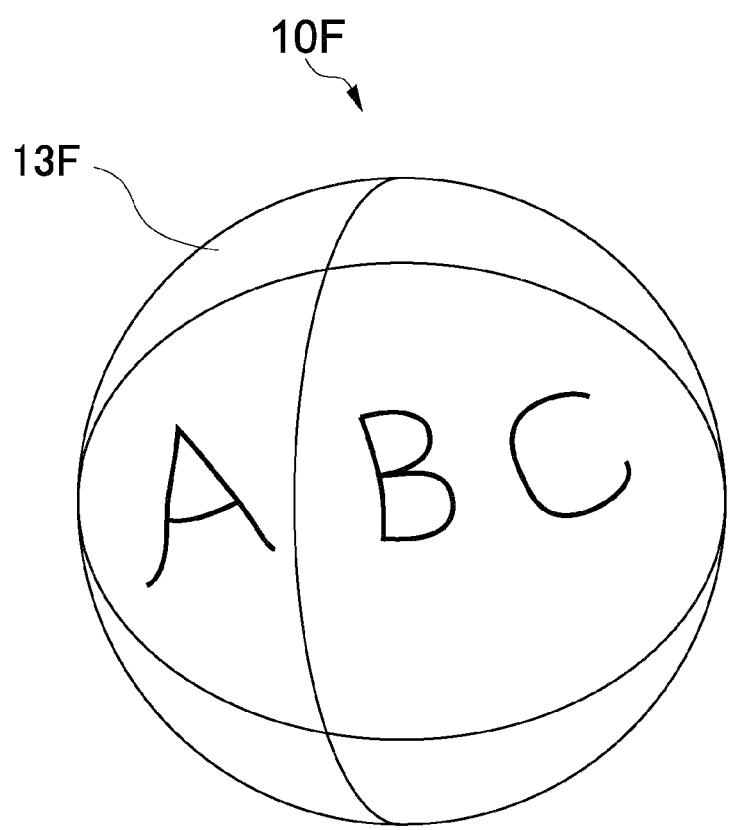
FIG. 15 is a diagram showing a modified example 5 of the present disclosure.

The input apparatus according to each of the embodiments and the modified examples of the present disclosure has the potential for not only detecting static applied pressures on an object surface but also detecting dynamic applied pressures. For example, an operation of handwrite-inputting characters on the surface of a plate 13F of an input apparatus 10F as shown in FIG. 15 is considered. In this case, the controller generates time-series information on calculated pressure-applied positions as handwriting information and supplies the handwriting information to an electronic device, whereby the input apparatus may be used as a handwrite-input means. In this case, by combining pressure-applied-position information and applied-pressure information, handwriting information incorporating writing pressures may be generated. Based on the writing-pressure information, various controls on a weight of a handwritten line, recognition of a start point/end point of a line segment, and the like may be executed.

Further, in the modified example 5, by entirely covering the surface of the plate 13F with a sheet made of a smooth material, when a finger passes a position that the plates 13F are patched together, the finger is not caught by the plates 13F, whereby smooth handwrite-input may be performed.

Modified Example 6

Figure 16:
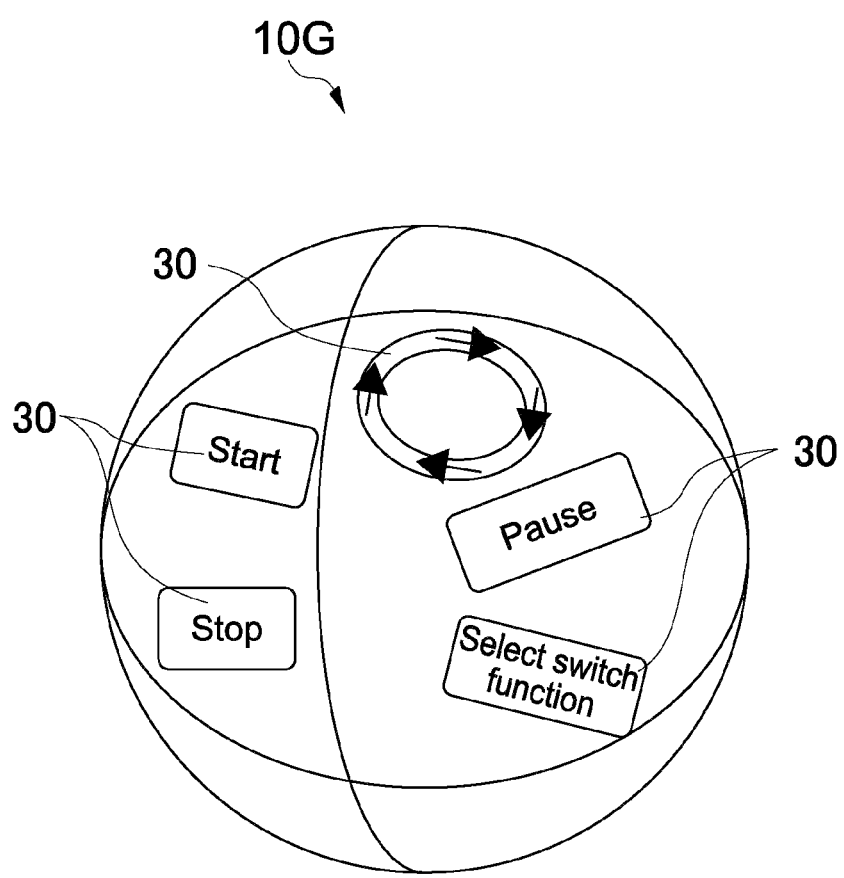
FIG. 16 is a diagram showing a modified example 6 of the present disclosure.

FIG. 16 shows that a plurality of areas are provided on the surfaces of plates 13G of an input apparatus 10G as buttons 30. To the plurality of areas, functions such as switch inputs, volume/channel changes, and the like are allocated. Further, functions displayed on the surfaces and made effective may be switchable. As means for switching the functions displayed on the surfaces and made effective, a method of providing an area for a selection switch always allocated to the surface as a button and double-clicking the button, and the like may be employed.

Modified Example 7

Figure 17:
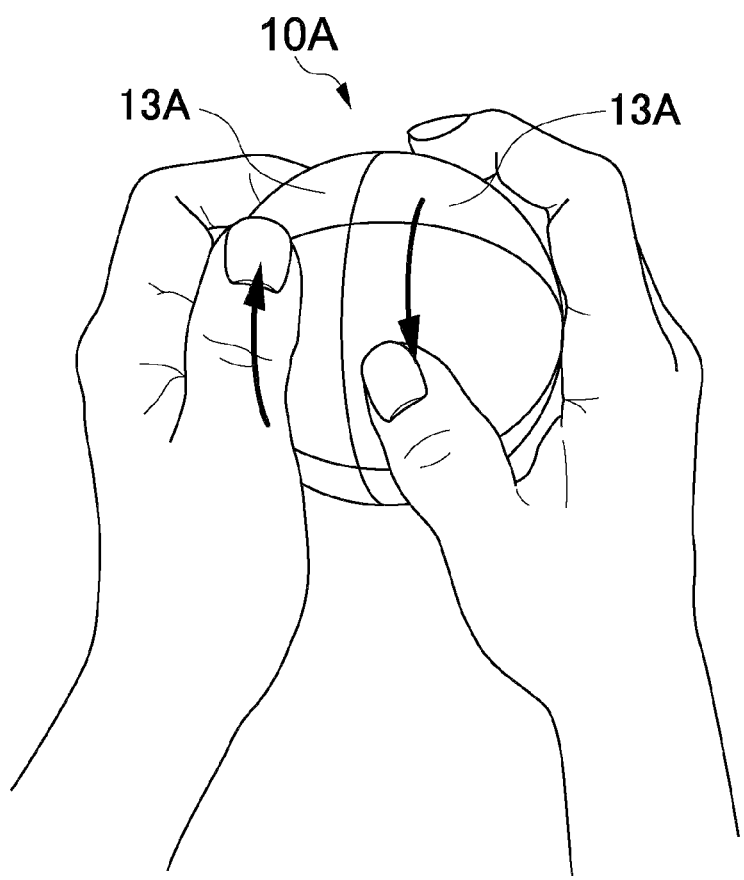
FIG. 17 is a diagram showing a modified example 7 of the present disclosure.

As shown in FIG. 17, the input apparatus 10A of the above-mentioned second embodiment enables an operation in which the input apparatus 10A is grasped with fingers of both hands, the respective hands are twisted in opposite directions, and the respective fingers of the both hands slide on the surfaces of the plates 13A. In response to such operations, the controller may recognize shapes of contact areas of fingers of right and left hands, and detect rotational directions of the recognized shapes of the contact areas as hand-twisting directions. As a result, for example, an input operation such as a handle operation of a racing game may be performed.

Modified Example 8

By increasing the partitioning number of the base to some extent, the shape of a contact object may be recognized. For example, in a case of grasping the apparatus with a hand, positions of five fingers may be detected. If positions of five fingers are detected, the apparatus may calculate the posture of the hand. This is because a hand of a man may be considered as a rigid link mechanism structured by bones. Here, it is assumed that a man moves/rotates the input apparatus according to each of the embodiments and the modified examples of the present disclosure in a three-dimensional space with the posture of a hand in mind. In this case, three-dimensional space coordinates that the man has in his mind may be associated with coordinates in a virtual three-dimensional space that software calculating the posture of a hand has. That is, a man may intuitively control the position/posture of a virtual object in the software.

Modified Example 9

By calculate the position/posture of a hand grasping the input apparatus of each of the embodiments and the modified examples of the present disclosure, and by setting positions of areas to which the functions of the modified example 6 are allocated as relative positions with respect to the position/posture of a hand, it is necessary for a user to select grasping positions with respect to positions of the areas to which the functions are allocated, whereby operability may be improved.

The present disclosure contains subject matter related to that disclosed in Japanese Priority Patent Application JP 2010-163003 filed in the Japan Patent Office on Jul. 20, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A contact-pressure detecting apparatus, comprising:
    a base having an arbitrary shape with a hollow space therein;
    at least one area on a surface of the base having a polygonal periphery;
    pressure sensors located at three or more vertices of each polygonal shaped area; and
    a respective plate corresponding with each such polygonal shaped area of the surface of the base, each plate covering its respective polygonal shaped area of the surface of the base, each plate sandwiching the at least three pressure sensors between the plate and the base;
    a calculating section positioned within the hollow space, the calculating section deriving pressure measurement information and position of pressure application information from the pressure sensors.

2. The contact-pressure detecting apparatus according to claim 1,
    wherein the calculating section is configured to calculate, based on detection results of the at least three pressure sensors provided on a given area, the amount of the pressure applied to the plate corresponding to the area and the position where the pressure is applied.

3. The contact-pressure detecting apparatus according to claim 2, wherein:
the vertices of two or more polygonal areas coincide, and
one pressure sensor is provide at each such coincident vertex, the one pressure sensor detecting pressure applied to each plate corresponding to each area sharing the one pressure sensor.

4. The contact-pressure detecting apparatus according to claim 1, wherein:
the base has an arbitrary solid shape, and
the base is covered by the plurality of plates three-dimensionally.

5. The contact-pressure detecting apparatus according to claim 1, further comprising a movement detecting section configured to detect a movement in a three-dimensional space.

6. An input apparatus, comprising:
a base having an arbitrary shape with a hollow space therein;
at least one area on a surface of the base having a polygonal periphery;
pressure sensors located at three or more vertices of each polygonal shaped area; and
a respective plate corresponding with each such polygonal shape area of the surface of the base, each plate covering its respective polygonal shaped area of the surface of the base, each plate sandwiching the at least three pressure sensors between the plate and the base;
a calculating section positioned within the hollow space, the calculating section deriving pressure measurement information and position of pressure application information from the pressure sensors, the controller section configured to generate information for controlling a device that is a control target based on the derived pressure measurement information and position of pressure application information.

7. The input apparatus according to claim 6, wherein the controller section is configured to calculate, based on detection results of the at least three pressure sensors provided on a given area, the pressure applied to the plate corresponding to the area and the position of the applied pressure, and
to generate information for controlling the device based on the calculated result.

8. The to claim 7, wherein:
the vertices of two or more areas coincide, and
one pressure sensor is provide at each such coincident vertex, the one pressure sensor detecting pressure applied to each plate corresponding to each area sharing the one pressure sensor.

9. The input apparatus according to claim 6, wherein:
the base has an arbitrary solid shape, and
the base is covered by the plurality of plates three-dimensionally.

10. The input apparatus according to claim 6, further comprising a movement detecting section configured to detect a movement in a three-dimensional space, wherein the controller section is configured to generate information for controlling the device based on results detected by the respective pressure sensors and a result detected by the movement detecting section.

11. The input apparatus according to claim 6, further comprising a radio communication section configured to transmit the information for controlling the device generated by the controller section by radio.

12. An input apparatus, comprising:
a base having an arbitrary shape;
at least three pressure-sensitive sensors provided on different vertex positions of a polygon having at least three vertices, respectively, the polygon being set on each of a plurality of areas partitioning at least part of an area on a surface of the base;
a plurality of plates arranged corresponding to the areas of the surface of the base, respectively, the plurality of plates covering the surface of the base and sandwiching the at least three pressure sensors between the plates and the base;
a controller section configured to generate information for controlling a device being a control target based on results detected by the respective pressure sensors; and
means for returning a response to a pressing operation by a user in real time.

13. The input apparatus according to claim 6, wherein the controller section is configured to generate time-series information on at least calculated pressure-applied positions as handwriting information.

* * * * *